United States Patent
Arai

(10) Patent No.: US 9,181,917 B2
(45) Date of Patent: Nov. 10, 2015

(54) START CONTROL SYSTEM AND VEHICLE

(75) Inventor: Katsuhiro Arai, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 367 days.

(21) Appl. No.: 13/976,114

(22) PCT Filed: Oct. 7, 2011

(86) PCT No.: PCT/JP2011/073182
§ 371 (c)(1),
(2), (4) Date: Jun. 26, 2013

(87) PCT Pub. No.: WO2012/090569
PCT Pub. Date: Jul. 5, 2012

(65) Prior Publication Data
US 2013/0269644 A1    Oct. 17, 2013

(30) Foreign Application Priority Data
Dec. 27, 2010  (JP) .................. 2010-290653

(51) Int. Cl.
| | |
|---|---|
| *F16D 48/00* | (2006.01) |
| *F16D 48/08* | (2006.01) |
| *F02N 15/00* | (2006.01) |
| *B60W 10/02* | (2006.01) |
| *B60W 10/06* | (2006.01) |
| *B60W 30/18* | (2012.01) |

(52) U.S. Cl.
CPC .............. *F02N 15/00* (2013.01); *B60W 10/02* (2013.01); *B60W 10/06* (2013.01); *B60W 30/18027* (2013.01); *F16D 48/08* (2013.01); *B60W 2300/36* (2013.01); *B60W 2510/1005* (2013.01); *B60W 2710/022* (2013.01); *B60W 2710/0644* (2013.01); *F16D 2500/70412* (2013.01)

(58) Field of Classification Search
CPC ......... F02N 15/00; F16D 48/00; F16D 48/08; F16D 2500/70412; B60W 10/02; B60W 10/06; B60W 10/08; B60W 30/18027; B60W 2510/1005; B60W 2710/022
See application file for complete search history.

(56) References Cited

U.S. PATENT DOCUMENTS

| | | | |
|---|---|---|---|
| 8,965,648 B1 * | 2/2015 | Murayama .............. | F16D 48/06 701/66 |
| 2006/0185459 A1 | 8/2006 | Matsumura et al. | |
| 2008/0083579 A1 | 4/2008 | Okuda et al. | |
| 2008/0254942 A1 | 10/2008 | Minami | |
| 2010/0057313 A1 | 3/2010 | Arai | |
| 2010/0185371 A1 | 7/2010 | Tomoda | |

FOREIGN PATENT DOCUMENTS

| | | |
|---|---|---|
| JP | 61-38229 U | 3/1986 |
| JP | 2001-254764 A | 9/2001 |
| JP | 2006-226433 A | 8/2006 |
| JP | 2006-335197 A | 12/2006 |
| JP | 2008-232421 A | 10/2008 |
| JP | 2010-019277 A | 1/2010 |
| JP | 2010-059802 A | 3/2010 |

OTHER PUBLICATIONS

Official Communication issued in International Patent Application No. PCT/JP2011/073182, mailed on Dec. 27, 2011.

* cited by examiner

*Primary Examiner* — Hieu T Vo
(74) *Attorney, Agent, or Firm* — Keating & Bennett, LLP

(57) ABSTRACT

In a start control system for a vehicle, a memory stores a first setting value used to control a clutch to attain a start standby state and a second setting value used to control the clutch to attain a start preparation position. A clutch controller controls the clutch to attain a start standby state based on the first setting value upon determining that the vehicle has proceeded to a start standby period and controls the clutch to attain a start preparation state, in which the distance between the clutch disks is smaller than that in the start standby state, based on the second setting value upon determining the vehicle has proceeded to a start preparation period. The clutch controller controls the clutch such that the distance between the clutch disks is smaller than that in the start preparation state and carries out control such that an engine speed approaches an engine target speed.

9 Claims, 11 Drawing Sheets

START CONTROL SYSTEM AND VEHICLE

BACKGROUND OF THE INVENTION

1. Field of the Invention

The present invention relates to a technique of automatically controlling a clutch provided in a vehicle.

2. Description of the Related Art

A vehicle provided with a transmission device can perform a shift change by changing a transmission gear ratio in the transmission device. In order to perform a shift change, a clutch provided upstream of the transmission device must be disengaged so that torque from the engine is not transmitted to the transmission device.

One type of transmission device is a manual transmission device in which the operation of engaging and disengaging the clutch is manually controlled by a driver. Another type of transmission device is an automatic transmission device in which the operation of engaging and disengaging the clutch is controlled automatically.

A person driving a vehicle provided with a manual transmission device adjusts an engine speed, a vehicle acceleration, and time until the clutch engages by operating the accelerator and clutch at the time of starting the vehicle. The driver attempts to start the vehicle as he/she intends by operating the accelerator and the clutch. In other words, the driver might feel uncomfortable about abrupt acceleration and stressful about too slow acceleration. The driver performs the accelerator operation and the clutch operation so that acceleration is as smooth and comfortable as possible. In the moment that the clutch starts to engage in particular, in other words, the moment the clutch starts to transmit torque, a slight shock may occur. The driver can reduce the magnitude of the shock by carefully carrying out the engagement operation of the clutch.

As for a vehicle provided with an automatic transmission device, it is desirable that traveling proceeds as intended by a driver at the time of starting the vehicle. In addition, the shock that may occur at the moment the clutch is engaged is preferably as small as possible.

JP 61-38229 U discloses a technique using an automatic clutch device. The disclosed automatic clutch device is adapted to select among preset different clutch control patterns in response to a change ratio for an accelerator position. More specifically, a control pattern for a sudden start and climbing start is selected if the accelerator position corresponds to a prescribed value or more, and a control pattern for a normal start is selected if the position corresponds to a value less than the prescribed value so that the clutch control based on the control patterns is performed.

JP 2008-232421 A discloses a clutch controller. The clutch controller is controlled such that, if the engine is operated in a predetermined driving range, torque transmitted to the downstream side through the clutch is approximated to the engine torque.

SUMMARY OF THE INVENTION

A start control system according to a preferred embodiment of the present invention includes an input unit that inputs an accelerator position, a clutch controller that controls a clutch, and a storing unit that stores setting information. The storing unit includes a setting value storage that stores a first setting value used to control the clutch to attain a start standby state and a second setting value used to control the clutch to attain a start preparation state, and an association information storage that stores association information that associates the accelerator position with an engine target speed. The clutch controller includes first, second, and third controllers. The first controller controls the clutch to attain the start standby state based on the first setting value upon determining that the vehicle has proceeded to a start standby period. The second controller controls the clutch to attain the start preparation state based on the second setting value upon determining that the vehicle has proceeded to a start preparation period. The distance between clutch disks in the start preparation state is smaller than that in the start standby state. The third controller controls the clutch in such a direction that the distance between the clutch disks is smaller than that in the start preparation state and carries out control such that an engine speed approaches the engine target speed based on the association information.

At the time of starting, the clutch is subjected to two-stage preparation including a start standby position and a start preparation position. Control to the start standby state, which corresponds to the first stage preparation, reduces the distance between clutch disks before the beginning of the start control and serves to improve responsiveness at the time of starting. Control to the start preparation position, which corresponds to the second stage preparation, reduces a stroke until the clutch disks engage and allows for a reduction of a shock that occurs when the clutch disks start to engage. In this manner, start control with a reduced shock and high responsiveness is achieved.

Preferred embodiments of the present invention provide a technique of reducing a shock that may occur in a period in which the clutch starts to engage.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A vehicle including an automatic start control system according to preferred embodiments of the present invention will be described in conjunction with the accompanying drawings. In the following, a motorcycle will be described as an example of the vehicle including the automatic start control system according to the preferred embodiments. However, the automatic start control system according to the preferred embodiments is applicable to a vehicle other than the motorcycle, such as an automobile, for example.

Figure 1:
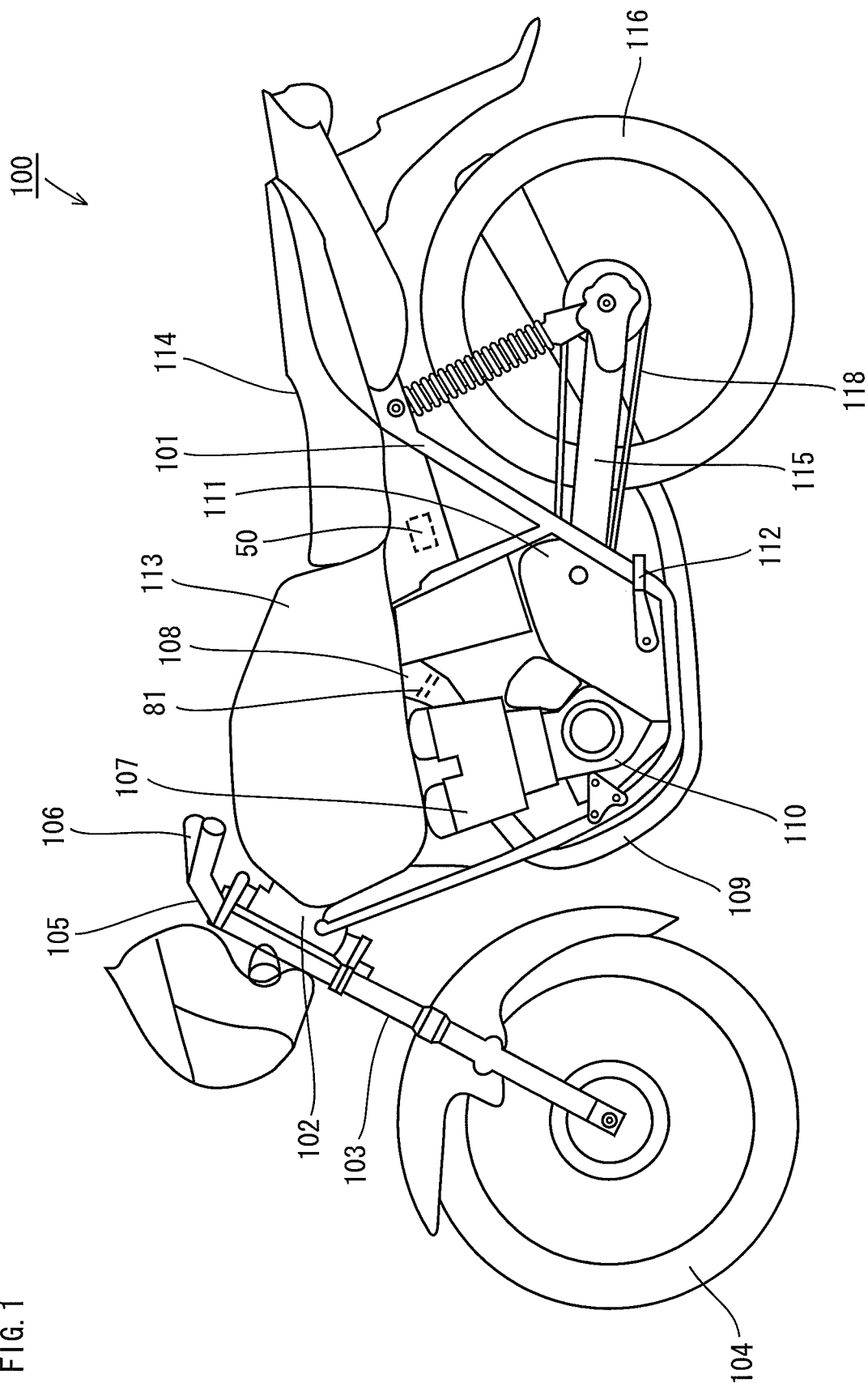
FIG. 1 is a side view of a motorcycle including an automatic start control system according to a preferred embodiment of the present invention.

FIG. 1 is a side view of a motorcycle according to a preferred embodiment of the present invention. The motorcycle 100 includes a main body frame 101. A head pipe 102 is provided at a front end of the main body frame 101. A pair of front forks 103 is provided at the left and right sides of the head pipe 102. A front wheel 104 is supported rotatably at lower ends of the front forks 103. A handle 105 is supported at an upper end of the head pipe 102.

The handle 105 is provided with an accelerator grip 106. The main body frame 101 is provided with a four-cylinder engine 107, for example. A throttle body 108 is attached to an intake port of the engine 107. An exhaust pipe 109 is attached to an exhaust port of the engine 107. The throttle body 108 is provided with an electronically controlled throttle valve 81. The amount of air supplied to the four cylinders of the engine 107 is regulated by adjusting the position of the throttle valve 81 (hereinafter referred to as the throttle position).

A crankcase 110 is provided under the engine 107. A crank 2 for the engine 107 is stored in the crankcase 110.

A transmission case 111 is provided behind the crankcase 110. A transmission device 5 and a shift device 6 are provided in the transmission case 111. A shift pedal 112 is provided at a side of the transmission case 111.

According to the present preferred embodiment, the operation of disengaging a clutch 3 by a rider is not necessary when the gear position of the transmission device 5 is switched. The motorcycle 100 is provided with a semi-automatic transmission control system adapted to automatically switch between gear positions of the transmission device 5 in response to a shift operation by the rider. The clutch 3 according to the present preferred embodiment is preferably a wet-type multi-disk clutch, for example.

A fuel tank 113 is provided above the engine 107. A seat 114 is provided behind the fuel tank 113. A controller 50 is provided under the seat 114.

The main body frame 101 is attached to a rear arm 115 capable of swinging in an up-down direction. A rear wheel 116 is supported rotatably at a rear end of the rear arm 115. A chain 118 is attached between the transmission case 111 and the rear wheel 116.

Figure 2:
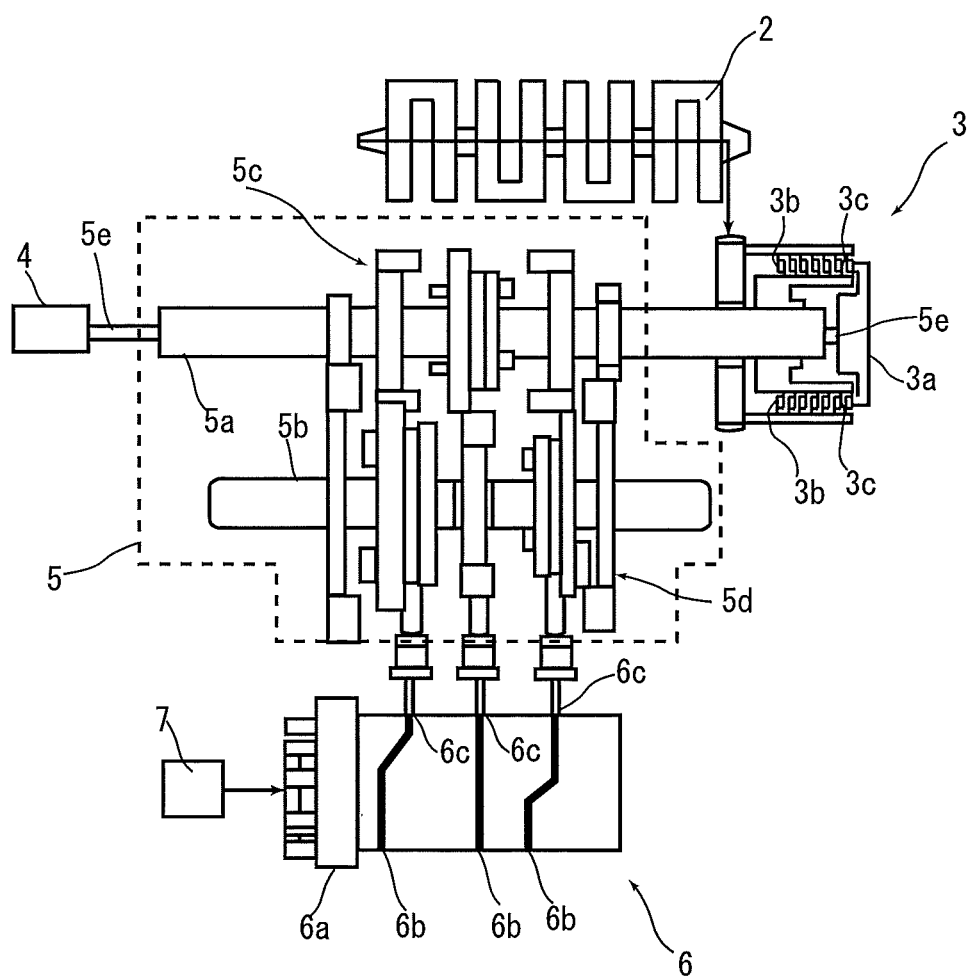
FIG. 2 shows a transmission device and a shift device.

The transmission device 5 and the shift device 6 stored in the transmission case 111 will now be described. FIG. 2 shows the transmission device 5 and the shift device 6.

As shown in FIG. 2, the transmission device 5 includes a main shaft 5a and a drive shaft 5b. A multiple-step shift gear 5c is mounted to the main shaft 5a and a multi-step shift gear 5d is mounted to the drive shaft 5b. The shift gears 5c and 5d define, for example, a gear group that can shift among five steps.

The main shaft 5a is coupled to the crank 2 of the engine 107 through the clutch 3. The clutch 3 includes a pressure plate 3a, a plurality of clutch disks 3b, and a plurality of friction disks 3c. The clutch disks 3b are rotated by torque transmitted from the crank 2. The friction disks 3c are coupled to the main shaft 5a and rotate together with the main shaft 5a.

The friction disks 3c are energized by the pressure plate 3a in such a direction that the disks 3c are closely contacted to the clutch disks 3b. In the following, a state in which the plurality of clutch disks 3b and the plurality of friction disks 3c are closely contacted with one another will be referred to as an engaged state of the clutch 3 and a state in which they are spaced apart from one another will be referred to as a disengaged state of the clutch 3. When the clutch 3 is in the engaged state, the torque of the crank 2 is transmitted to the main shaft 5a through the clutch disks 3b and the friction disks 3c while in the disengaged state of the clutch 3, the torque of the crank 2 is not transmitted to the main shaft 5a.

A push rod 5e is inserted in the main shaft 5a. One end of the push rod 5e is coupled to the pressure plate 3a and the other end is coupled to an electric or hydraulic clutch actuator 4.

According to the present preferred embodiment, when the clutch actuator 4 is driven by control of the controller 50, the push rod 5e is pushed out toward the clutch 3. In this manner, the pressure plate 3a is pushed so that the clutch disks 3b and the friction disks 3c are spaced apart from one another. As a result, the clutch 3 attains a disengaged state.

When the clutch 3 is in an engaged state, torque transmitted from crank 2 to the main shaft 5a is transmitted to the drive shaft 5b through the shift gears 5c and 5d. The drive shaft 5b is attached with the chain 118 shown in FIG. 1. The torque of the drive shaft 5b is transmitted to the rear wheel 116 through the chain 118.

The reduction ratio between the main shaft 5a and the drive shaft 5b is determined based on the combination of the shift gears 5c and 5d. The shift gears 5c and 5d are moved by a shift mechanism 6.

The shift mechanism 6 includes a shift cam 6a. The shift cam 6a includes a plurality of cam grooves 6b (for example, three in FIG. 2). The cam grooves 6b are each mounted with a shift fork 6c. The shift cam 6a is connected to an electric or hydraulic shift actuator 7 through a link mechanism that is not shown.

According to the present preferred embodiment, when the shift actuator 7 is driven in response to control by the controller 50, the shift cam 6a is rotated. In this manner, the shift forks 6c move along the cam grooves 6b. As a result, one of the shift gears 5c and 5d moves so that the gear position of the transmission device 5 is changed.

Figure 3:
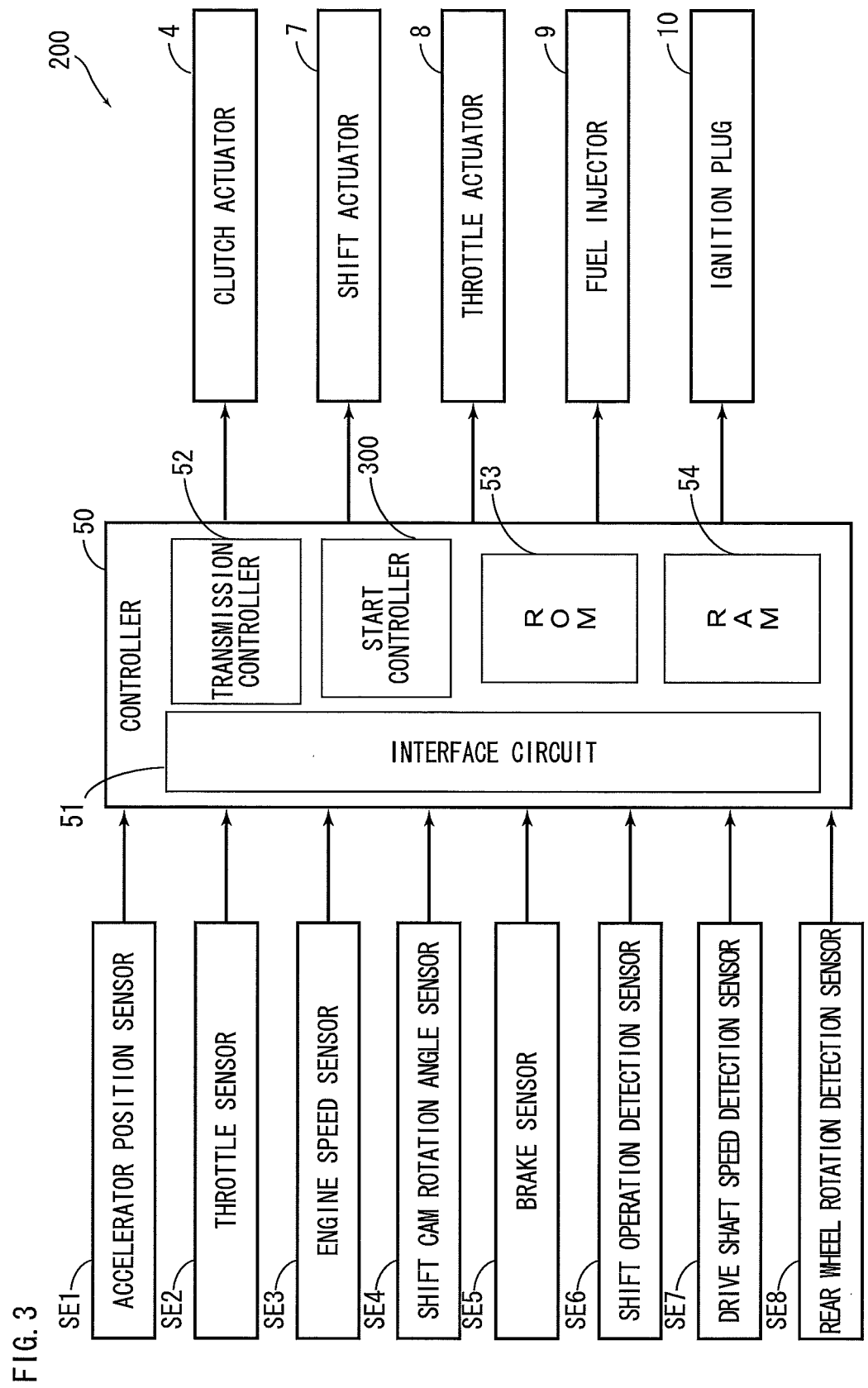
FIG. 3 is a block diagram of a control system including an automatic start control system.

A transmission control system 200 in the motorcycle 100 will now be described. FIG. 3 is a block diagram of the transmission control system 200 according to the present preferred embodiment. The automatic start control system according to the present preferred embodiment is defines a portion of the transmission control system 200.

The transmission control system 200 includes a transmission controller 52 and various sensors and actuators shown in FIG. 3. The automatic start control system includes a start controller 300 and various sensors and actuators as shown in FIG. 3. The transmission controller 52 is a functional unit implemented when a program stored in a ROM 53 runs on a CPU while using a RAM 54 as a working area. The start controller 300 includes a hardware circuit according to the present preferred embodiment. The start controller 300 however may be defined by a CPU and a program operating on the CPU, for example.

As shown in FIG. 3, the transmission control system 200 includes an accelerator position sensor SE1, a throttle sensor SE2, an engine speed sensor SE3, a shift cam rotation angle sensor SE4, a brake sensor SE5, a shift operation detection sensor SE6, a drive shaft speed detection sensor SE7, a rear wheel rotation detection sensor SE8, the controller 50, the clutch actuator 4, the shift actuator 7, a throttle actuator 8, a plurality of fuel injectors 9, and a plurality of ignition plugs 10.

The accelerator position sensor SE1 detects an operation amount of the accelerator grip 106 (hereinafter referred to as the "accelerator position") by a rider and applies the detected accelerator position to the controller 50.

The throttle sensor SE2 detects a throttle position and applies the detected throttle position to the controller 50.

The engine speed sensor SE3 detects a speed of the engine 107 and applies the detected speed to the controller 50. According to the present preferred embodiment, the engine speed sensor SE3 detects an angular velocity of the crank 2 to detect the engine speed of the engine 107.

The shift cam rotation angle sensor SE4 detects a rotation angle of the shift cam 6a and applies the detected rotation angle to the controller 50.

The brake sensor SE5 detects an amount of the brake lever (not shown) and/or the brake pedal (not shown) operated by a rider and applies the detected operation amount to the controller 50.

The shift operation detection sensor SE6 detects a direction of the shift pedal 112 operated by a rider and applies a signal indicating the detected operation direction (a signal indicating shift up or shift down) to the controller 50. The shift operation detection sensor SE6 includes, for example, a potentiometer, a load sensor, or a magneto-strictive sensor.

The drive shaft speed detection sensor SE7 detects a rotation speed of the drive shaft 5b and supplies the detected rotation speed to the controller 50.

The rear wheel rotation detection sensor SE8 detects a rotation speed of the rear wheel 116 and supplies the detected rotation speed to the controller 50.

The controller 50 includes an interface circuit 51, the transmission controller (central processing unit) 52, the ROM (Read Only Memory) 53, the RAM (Random, Access Memory) 54, and the start controller 300.

The output signals from the sensors SE1 to SE8 are applied to the transmission controller 52 or the start controller 300 through the interface circuit 51. The transmission controller 52 controls the output of the engine 107 based on the results of detection from the sensors SE1 to SE8. The start controller 300 carries out a start control of the vehicle based on the detection results from the sensors SE1 to SE8. The ROM 53 stores programs and the like that operate the transmission controller 52. The RAM 54 stores various kinds of data and also serves as a working area for the transmission controller 52.

The shift actuator 7 is, for example, an electric or hydraulic type device and is controlled by the transmission controller 52 to rotate the shift cam 6a.

The throttle actuator 8 includes, for example, an electric motor and is controlled by the transmission controller 52 to adjust the position of the throttle valve 81.

The fuel injectors 9 are provided corresponding to the cylinders of the engine 107. According to the present preferred embodiment, four fuel injectors 9 are provided corresponding to the four cylinders of the engine 107, for example.

The ignition plugs 10 are provided corresponding to the cylinders of the engine 107. According to the present preferred embodiment, four ignition plugs 10 are provided corresponding to the four cylinders of the engine 107, for example.

When the motorcycle 100 travels, the transmission controller 52 controls the throttle actuator 8 in response to an accelerator position detected by the accelerator position sensor SE1. In this manner, the throttle position is adjusted and the output of the engine 107 is controlled. The relationship between the accelerator position and the throttle position is previously stored in the ROM 53 (or RAM 54) of the controller 50.

The transmission controller 52 carries out feedback control of the throttle actuator 8 in response to the throttle position detected by the throttle sensor SE2. In this manner, the throttle position can be adjusted appropriately.

When a rider performs a shift operation, the transmission controller 52 disengages the clutch 3 by controlling the clutch actuator 4. The transmission controller 52 controls the throttle actuator 8 to adjust the throttle position so that the engine speed of the engine 107 is increased or decreased to an appropriate engine speed for the shift change.

The transmission controller 52 then controls the shift actuator 7 to rotate the shift cam 6a. This moves the shift fork 6c and thus the shift gear 5c or 5d. As a result, the gear position of the transmission device 5 is changed. Then, the transmission controller 52 controls the clutch actuator 4 to engage the clutch 3. In this manner, the shift change of the transmission device 5 ends.

Figure 4:
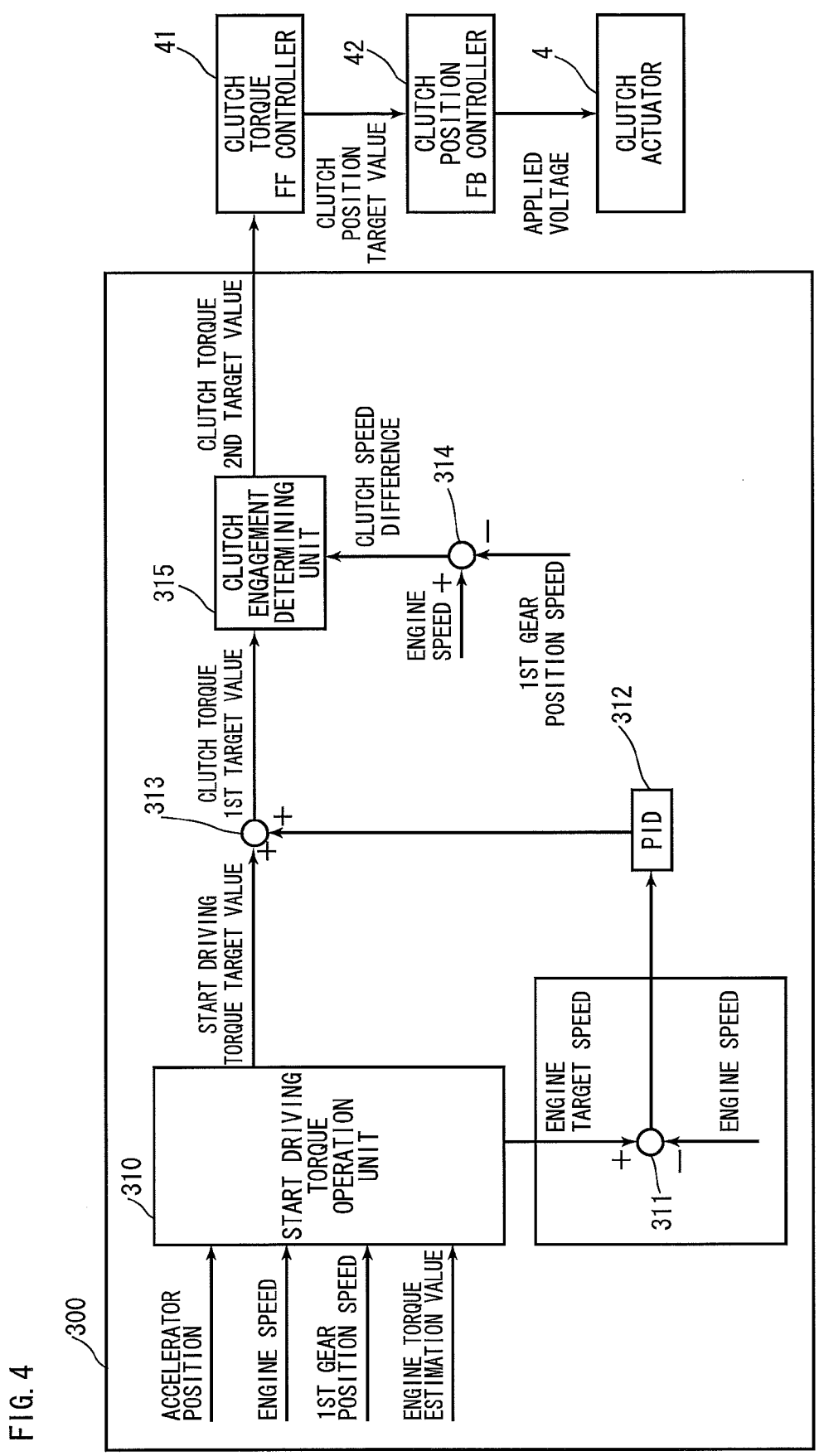
FIG. 4 is a block diagram of a start controller.
Figure 5:
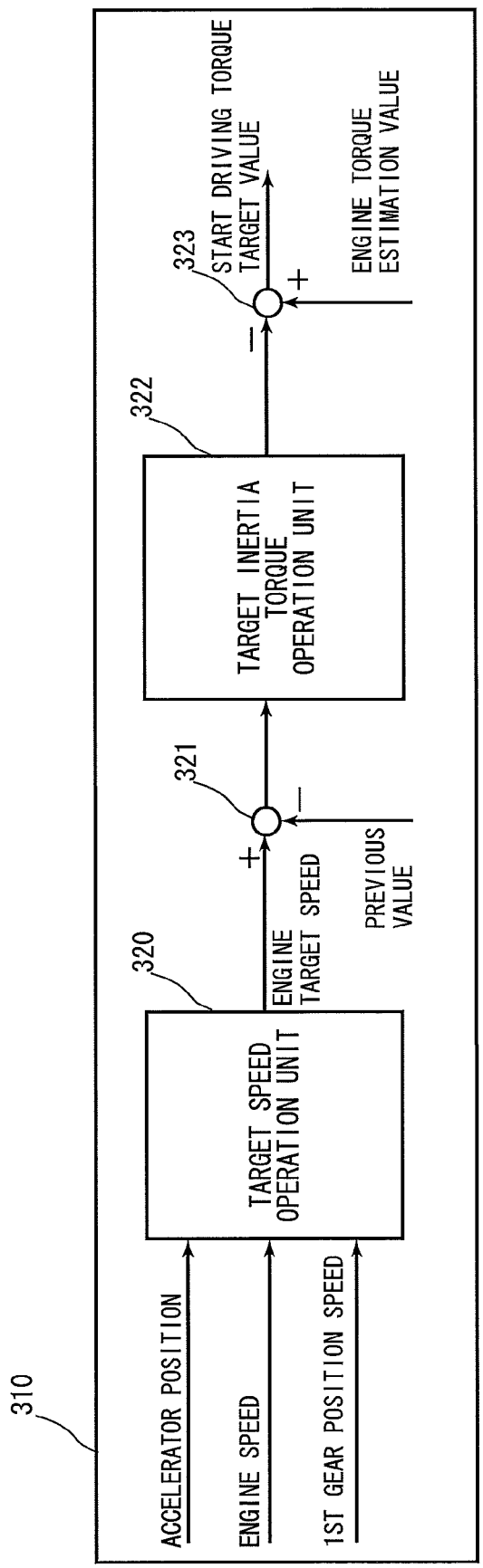
FIG. 5 is a block diagram of a driving torque operation unit.

Referring to FIGS. 4 and 5, the structure and operation of the start control system will now be described. FIG. 4 is a block diagram of the start controller 300. FIG. 5 is a block diagram of a start driving torque operation unit 310.

As shown in FIG. 4, the start controller 300 includes the start driving torque operation unit 310, a subtracter 311, a PID controller 312, an adder 313, a subtracter 314, and a clutch engagement determining unit 315.

The start driving torque operation unit 310 receives an accelerator position as an input from the accelerator position sensor SE1. The start driving torque operation unit 310 receives an engine speed as an input from the engine speed sensor SE3. The start driving torque operation unit 310 receives a first gear position speed from the driving shaft speed sensor SE7 as an input. The start driving torque operation unit 310 also receives an engine torque estimation value as an input. The engine torque estimation value is calculated by the controller 50. The controller 50 calculates the engine torque estimation value based on the outputs of the engine speed sensor SE3 and the throttle sensor SE2.

FIG. 5 is a block diagram of the start driving torque operation unit 310. As shown in FIG. 5, the start driving torque operation unit 310 includes the target speed operation unit 320, a subtracter 321, a target inertia torque operation unit 322, and a subtracter 323.

The target speed operation unit 320 receives an accelerator position, an engine speed, and a first gear position speed as inputs. The target speed operation unit 320 calculates an engine target speed in response to an accelerator position.

An engine target speed output from the target speed operation unit 320 is input to the subtracter 321. The subtracter 321 subtracts the previous engine target speed from the engine target speed to produce a target speed change amount.

The target inertia torque operation unit 322 obtains an inertia torque target value based on the target speed change amount. The subtracter 323 subtracts the inertia torque target value from the engine estimation torque to produce a start driving torque target value.

Referring back to FIG. 4, the start driving torque operation unit 310 outputs a start driving torque target value. The start driving torque target value is input to the adder 313.

The start driving torque operation unit 310 outputs an engine target speed. The engine target speed is an output of the target speed operation unit 320. The engine target speed is input to the subtracter 311.

The subtracter 311 subtracts the present engine speed from the engine target speed and outputs a speed difference to the PID controller 312. The PID controller 312 carries out feedback control of the speed difference and outputs a torque adjustment value to the adder 313. The adder 313 adds the torque adjustment value to the start driving torque target value to output a clutch torque first target value.

The subtracter 314 subtracts the first gear position speed from the engine speed and outputs a clutch speed difference. The clutch engagement determining unit 315 receives the clutch speed difference as an input and determines whether the clutch 3 can be engaged or not. The state in which the clutch 3 can be engaged indicates the state in which the speed difference between the clutch disks 3b and the friction disks 3c of the clutch 3 is not more than a prescribed value.

When the clutch 3 is not in an engageable state, the clutch engagement determining unit 315 maintains the start control. More specifically, the clutch torque first target value is directly output as a clutch torque second target value.

When the clutch 3 is in an engageable state, the clutch engagement determining unit 315 sets a completion value as a clutch torque second target value in order to complete the start control. The completion value is a clutch torque value previously set to complete engagement of the clutch 3. Control based on the completion value completes the engagement state of the clutch 3, in other words, the clutch attains an engaged state.

A clutch torque FF (feed forward) controller 41 outputs a clutch position target value in response to the clutch torque second target value. More specifically, a map representing the relationship between the clutch torque and the clutch position is stored in the ROM 53 or RAM 54. The clutch torque FF controller 41 converts the clutch torque second target value into a clutch position for output by referring to the map. The content of control carried out by the clutch torque FF controller 41 will be described in the following.

The clutch position FB (feedback) controller 42 receives the clutch position target value as an input and determines voltage used to move the clutch to the clutch position target value. The determined voltage is output to the clutch actuator 4 so that the clutch 3 is controlled by the clutch actuator 4.

A method of controlling a clutch using a start controller 300 according to the present preferred embodiment will now be described. According to the present preferred embodiment, when start control by the start controller 300 is carried out, the clutch 3 is subjected to three-phase control. The three phases will be described in the following.

The first phase is a first preparation stage of the start control. In the first phase, the clutch 3 is controlled to attain a "start standby position." The "start standby position" is a position where the friction disks 3c of the clutch 3 are moved a prescribed amount in the direction closer to the clutch disks 3b from a disengaged state. In the "start standby position," the clutch disks 3b and the friction disks 3c are not yet in contact with one another. The first phase is carried out when a shift change to the first gear position is carried out in a stationary state.

The second phase is a second preparation stage of the start control. In the second phase, the clutch 3 is controlled to attain a "start preparation position." In the "start preparation position," the friction disks 3c of the clutch 3 are set to a position even closer to the clutch disks 3b than in the "start standby state." The clutch 3 is controlled to attain the "start preparation position" so that some clutch torque may be generated. The "start preparation position" is set to a clutch position such that a torque that could result in a shock is prevented.

The third phase is an execution stage of the start control. In the third phase, the clutch 3 is controlled in a semi-clutch state. In the third phase, an engine target speed is calculated by an operation described in conjunction with FIGS. 4 and 5 and control toward the calculated engine target speed is carried out.

The control to the "start standby position" in the first phase is carried out under control of the controller 50 before entering the start control process. The controller 50 controls the clutch actuator 4 to carry out the control such that the friction disks 3c move to a preset start standby position. Setting information corresponding to the start standby position is stored in the RAM 54 or ROM 53.

The first phase is directed to improving the responsiveness in the start operation. When start control is performed from a state in which the friction disks 3c are most spaced apart from the clutch disks 3b, it takes a long time before the friction disks 3c start to contact the clutch disks 3b. If it takes a long time after start control is initiated until a semi-clutch state is attained, start is delayed, which may cause a rider concern. Therefore, according to the present preferred embodiment, when the rider sets the gear to the first gear position, the clutch 3 is controlled to attain a "start standby position" before an acceleration operation is started. In this manner, a highly responsive start operation can be performed.

The clutch 3 according to the present preferred embodiment is preferably a wet-type multi-disk clutch, for example. When the friction disks 3c approach the clutch disks 3b, the pressure of lubricating oil is applied to the clutch disks 3b. Therefore, if the distance between the friction disks 3c and the clutch disks 3c is extremely small, torque of the clutch disks 3b may be transmitted to the friction disks 3b before the friction disks 3c and the clutch disks 3b contact one another. In the first phase, the "start standby position" to which the friction disks 3c are controlled is set so that a sufficient distance is secured between these disks and torque from the clutch disks 3b is not transmitted to the friction disks 3c.

The control to the "start preparation position" in the second phase and the start control in the third phase are controlled by the above-described clutch torque FF controller 41.

As shown in FIG. 4, the clutch torque FF controller 41 outputs a clutch position target value according to the clutch torque second target value output from the clutch engagement determining unit 315. The clutch torque FF controller 41 outputs a "start preparation position" as a clutch position target value in the preparation stage before it carries out start control toward the engine target speed. The clutch 3 is controlled to attain a "start preparation position" so that the distance between the clutch disks 3b and the friction disks 3c is even smaller than that in the "start standby state." As described above, a value is set based on a condition that a shock does not occur in connection with control of the clutch position. Setting information corresponding to the start preparation position is stored in the RAM 54 or ROM 53.

In the second phase, the distance between the clutch disks 3b and the friction disks 3c is extremely small as compared to the first phase. Therefore, torque may be transmitted between the disks depending on the state of lubricating oil, temperatures, etc.

In the second phase, when the clutch 3 is controlled to attain the "start preparation position," torque from the clutch disks 3b may be transmitted to the friction disks 3c in some cases. The torque transmission in the second phase may cause a slight shock depending on the amount of the torque that is transmitted. The shock is referred to as a "first case shock." According to the present preferred embodiment, a control that will be described below is carried out so that the "first case shock" is reduced.

The start control in the third phase is carried out by the clutch torque FF controller 41. The process in the third phase is a main portion of the start control and the control toward the engine target speed.

In the third phase, the friction disks 3c gradually increase their contact state with the clutch disks 3b, and control is carried out in a semi-clutch state.

In the second phase, the clutch 3 is controlled to attain the "start preparation position." Therefore, when the third phase is started, the friction disks 3c start from the "start preparation position" and start to move toward the clutch disks 3b. As described above, the "start preparation position" is set so that no shock occurs even when torque from the clutch disks 3b is transmitted to the friction disks 3c. However, when the clutch 3 is controlled to attain the "start preparation position" and the distance between the friction disks 3c and the clutch disks 3b is large, a stroke until the friction disks 3c contact the clutch disks 3b is prolonged. When the stroke before the friction disks 3c contact the clutch disks 3b is long, the pressure of lubricating oil generated when these disks contact is large, which causes a slight shock. The shock is referred to as a "second case shock." According to the present preferred embodiment, a control that will be described below achieves a reduction of the "second case shock."

The clutch torque FF controller 41 carries out a control toward the engine target speed while significantly reducing the "first case shock" and the "second case shock."

FIGS. 6 to 9 show the relationship among the "first case shock" and the "second case shock" and the control state of the clutch 3. In the following description in conjunction with FIGS. 6 to 9, the position of the friction disks 3c will be referred to simply as the "clutch position." In FIGS. 6 to 9, a clutch position h1 and an accelerator position h2 are shown in the upper frame. In FIGS. 6 to 9, a vehicle speed h3 is shown in the lower frame. The abscissa represents time for both the upper and lower frames. The upper and lower frames are arranged vertically on the same time base. Therefore, the relationship between states of the clutch position h1 and the accelerator position h2 and the vehicle speed at the same time is shown.

Figure 6:
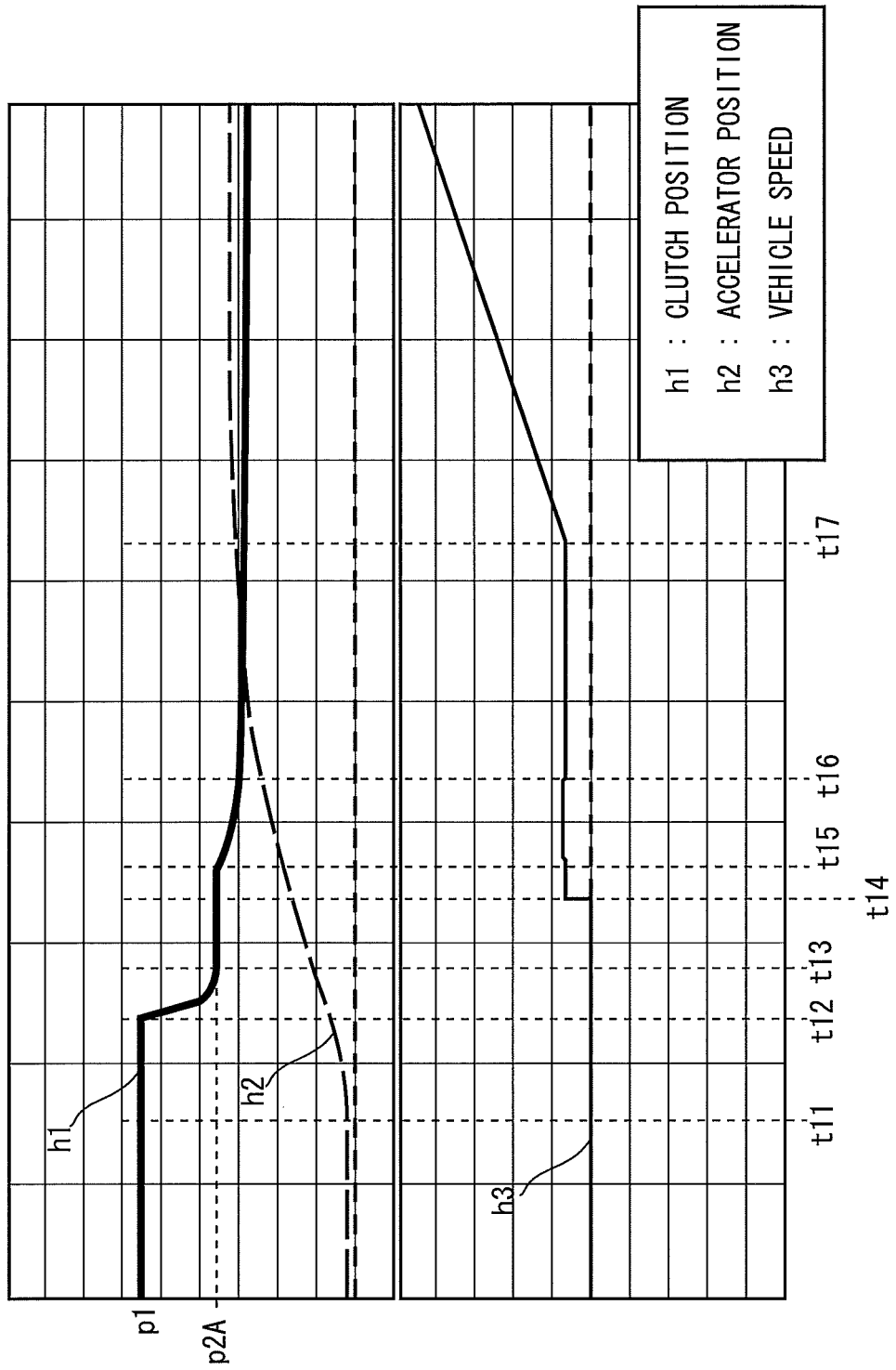
FIG. 6 shows a relationship between a clutch position and shock occurrence.

FIG. 6 shows a state in which the "first case shock" occurs. As shown, at time t11, a rider starts an acceleration operation. The acceleration position h2 gradually increases from time t11. At time t11, the clutch position h1 has already moved to a "start standby position" p1.

Then, at time t12, the clutch position h1 starts to move toward a "start preparation position." The clutch position h1 reaches a "start preparation position" p2A at time t13. Then, control toward the engine target speed is started at time t15.

The vehicle speed h3 is zero at time t11. The vehicle speed h3 is still zero at time t12 and t13. However, the vehicle speed h3 increases at time t14 before time t15 at which control toward the engine target speed is carried out.

The vehicle speed h3 increases at time t14, and then decreases slightly at time t16, and then increases again after time t17.

As for the speed change at time t14 to t17, the speed increases from zero, then decreases, and then increases again. The change including the increase, decrease, and increase is determined as a shock occurs in the start control according to the present preferred embodiment. In the example shown in FIG. 6, a shock occurs immediately after the clutch 3 is controlled to attain the "start preparation position," and therefore the shock is an example of the "first case shock." Note that whether the speed increases or decreases can be determined with respect to a prescribed threshold as a reference.

Figure 7:
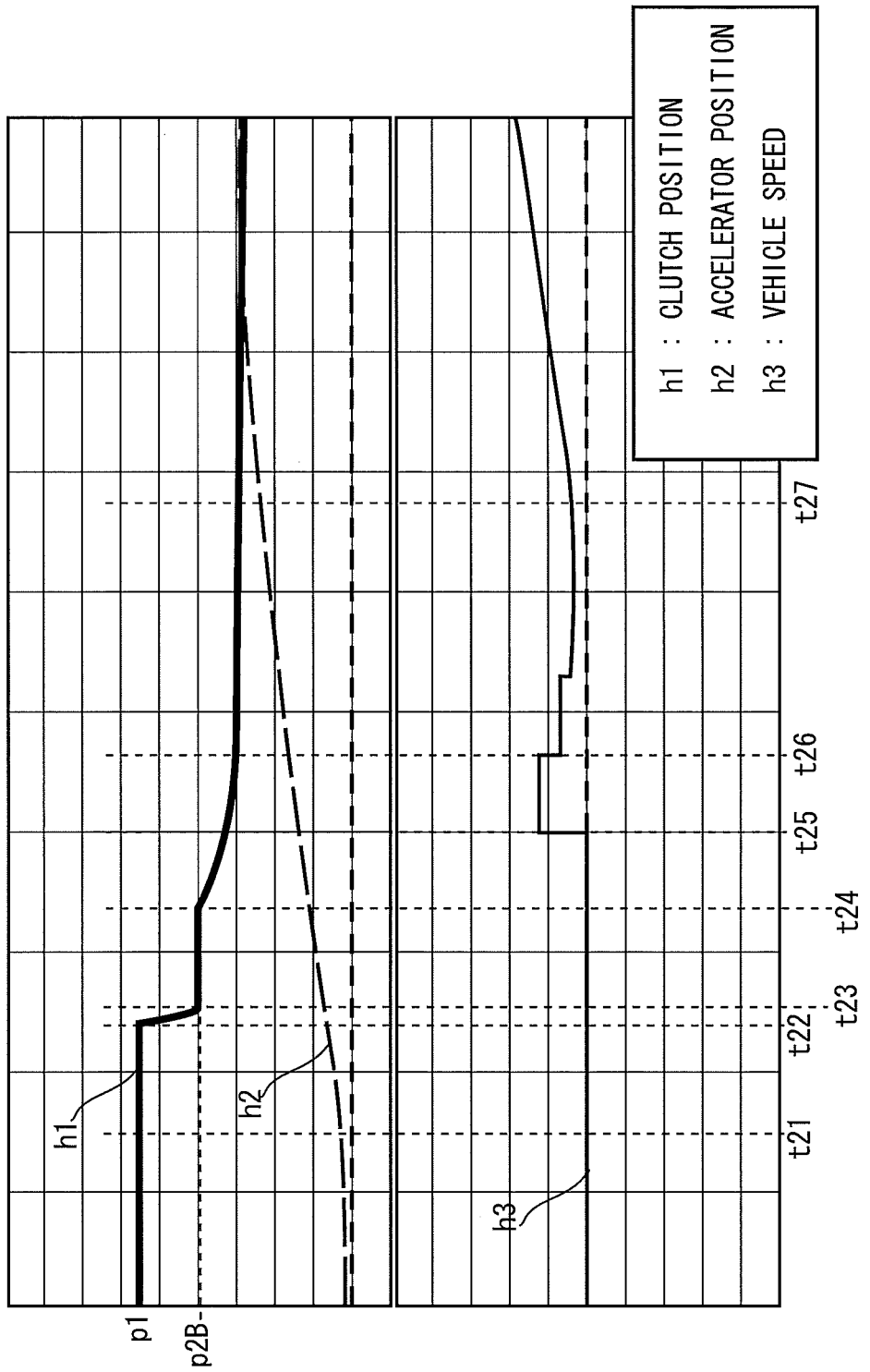
FIG. 7 shows a relationship between a clutch position and shock occurrence.

FIG. 7 shows the state in which the "second case shock" occurs. As shown, at time t21, a rider starts to perform an acceleration operation. The accelerator position h2 gradually increases from time t21. At time t21, the clutch position h1 has already moved to the "start standby position" p1.

Then, at time t22, the clutch position h1 starts to move toward the "start preparation position." The clutch position h1 reaches a "start preparation position" p2B at time t23. Then, at time t24, a control toward the engine target speed is started.

The vehicle speed h3 is zero at time t21. The vehicle speed h3 is still zero at time t22 and time t23. Furthermore, the vehicle speed h3 is zero at time t24 at which control of the clutch 3 toward the engine target speed is started.

Immediately after the control toward the engine target speed is performed, the vehicle speed h3 increases at time t25. The vehicle speed h3 increases at time t25, then decreases at time t26, and then increases again after time t27.

As for speed change at time t25 to t27, the speed once increases from zero, then decreases, and then increases again. As described above, the increase-decrease-increase change is determined as a shock occurrence. In the example shown in FIG. 7, a shock occurs immediately after the clutch 3 is controlled toward the engine target speed from the "start preparation position," and, therefore, this is an example of the "second case shock."

As described above, the clutch torque FF controller 41 according to the present preferred embodiment stores a setting value corresponding to the "start preparation position" in the RAM 54 or ROM 53. The clutch torque FF controller 41 corrects the setting value if the "first case shock" or the "second case shock" is detected.

The clutch torque FF controller 41 moves the setting value for the "start preparation position" in the direction in which clutch torque is reduced when the "first case shock" is detected. More specifically, the "start preparation position" is corrected in the direction in which the friction disks 3c move away from the clutch disks 3b.

More specifically, the "first case shock" occurs probably because the friction disks 3c have become too close to the clutch disks 3b by the control to the "start preparation position." Since the disks are too close, the pressure of lubricating oil increases instantaneously between the disks and the shock occurs before the control toward the engine target speed is started. Therefore, as described above, the setting value for the "start preparation position" is corrected in the direction in which clutch torque is reduced so that correction is achieved in the direction in which the "first case shock" is reduced for the next starting operation.

A correction value used to reduce the "first case shock" is stored in the RAM 54 or ROM 53 as a "preparation position subtraction amount." The "preparation position subtraction amount" is set to a prescribed value as an initial value, but the start controller 300 searches for an optimum "start preparation position" while adjusting the value of the "preparation position subtraction amount" as will be described below.

The clutch torque FF controller 41 moves the setting value for the "start preparation position" in the direction in which clutch torque increases when the "second case shock" is detected. More specifically, the "start preparation position" is corrected in such a direction that the friction disks 3c approach the clutch disks 3b.

In other words, the "second case shock" probably occurs because the distance between the friction disks 3c and the clutch disks 3b has become too large by the control toward the "start preparation position." Since the distance between the disks is still large, a stroke necessary to connect the disks is long when the control toward the initial target speed is started next. Therefore, the pressure of lubricating oil instantaneously increases when the friction disks 3c are close to the clutch disks 3b, and torque increases instantaneously. The instantaneous increase in the torque is transmitted as a shock. Therefore, as described above, the setting value of the "start preparation position" is corrected in such a direction that the clutch torque increases so that correction is made in such a direction that the "second case shock" is reduced for the next starting operation.

A correction value used to reduce the "second case shock" is stored as a "preparation position addition amount" in the RAM 54 or ROM 53. The "preparation position addition amount" is set to a prescribed value as an initial value while the start controller 300 searches for an optimum "start preparation position" while adjusting the "preparation position addition amount" as will be described below.

Such control to reduce the "first and second case shocks" is repeatedly carried out by feed forward control so that the "start preparation position" is optimized. The "start preparation position" is optimized so that a smooth, shock-free start can be achieved. Note that the "first and second case shocks" are detected based on a detection value from the rear wheel rotation detection sensor SE8.

Figure 8:
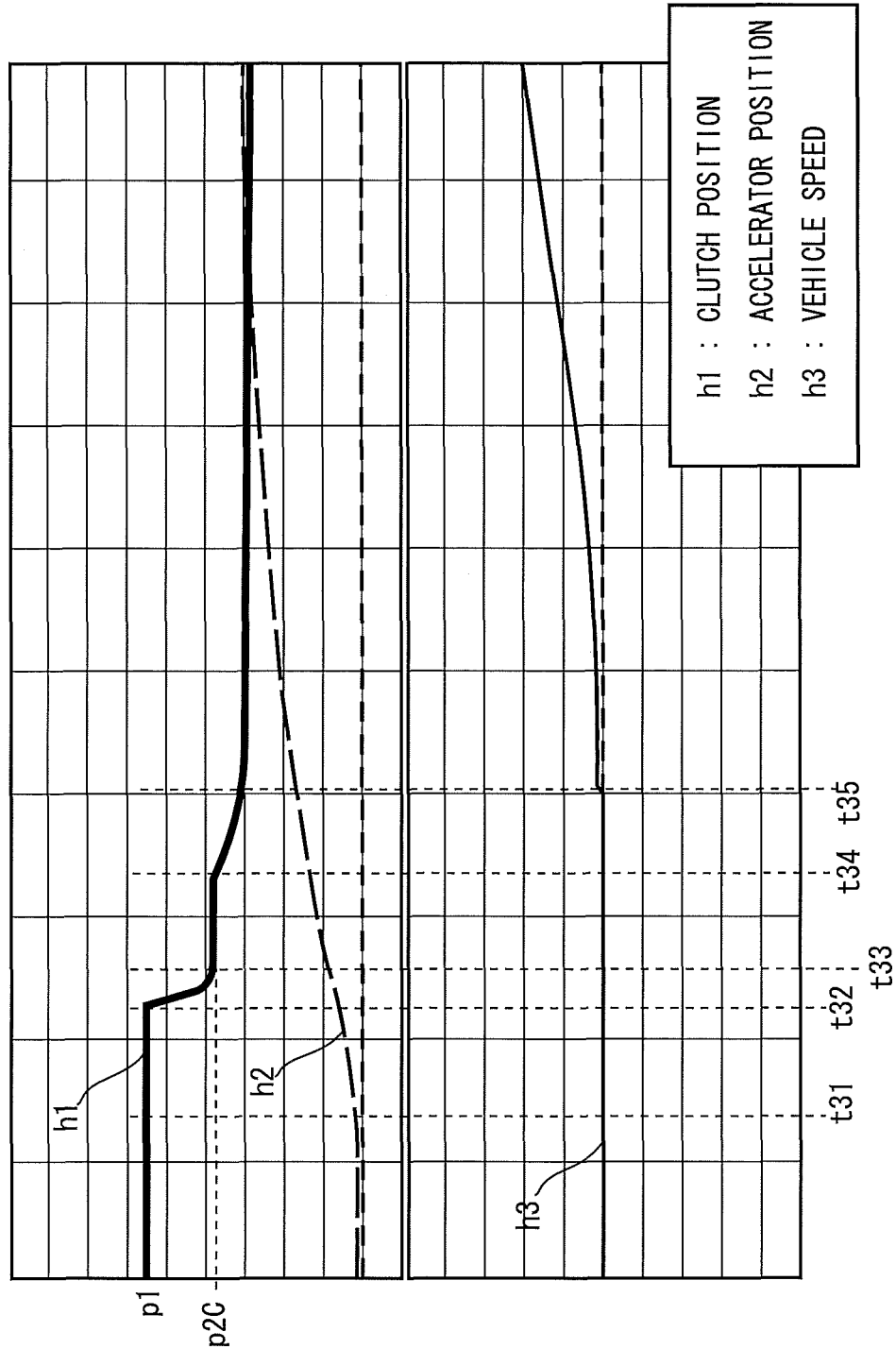
FIG. 8 shows a clutch position free from shock occurrence.

FIG. 8 shows the state when a start is carried out without the "first and second case shocks."

In the example in FIG. 8, change in the acceleration position h2 is based on the condition that an accelerator operation the same as that described in connection with FIGS. 6 and 7 has been performed. More specifically, at time t31, the acceleration operation has started. The clutch position h1 is optimized by feed forward control. In other words, the "start preparation position" is positioned between the examples shown in FIGS. 6 and 7. The clutch position h1 starts control to the "start preparation position" at time t32 and moves to the optimized "start preparation position" p2C at time t33. The vehicle speed h3 continues to be zero, while control toward the engine target speed starts at time t34. Then, the vehicle speed h3 increases after time t35. In the example shown in FIG. 8, the vehicle speed h3 does not go through the increase-decrease-increase change. As can be understood, the feed forward control by the clutch torque FF controller 41 allows the start to be smooth and shock-free.

The flow of the process by the above start controller 300 will be described in conjunction with flow charts in FIGS. 9 to 12.

Figure 9:
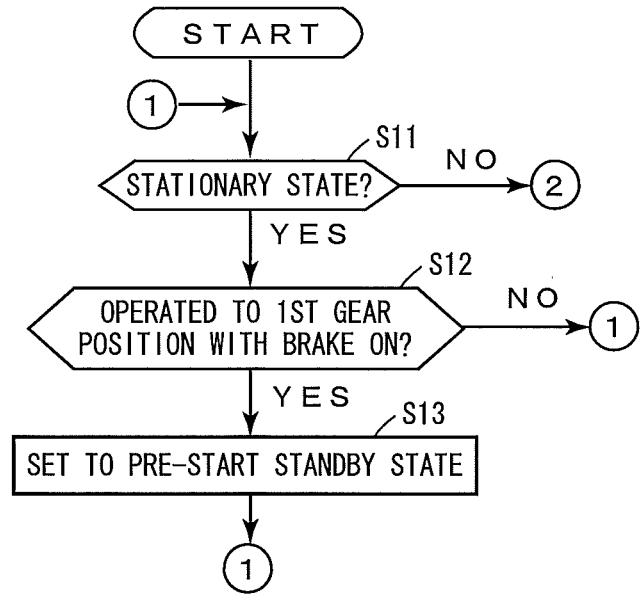
FIG. 9 is a flow chart for showing the content of an automatic start control process.

Referring to FIG. 9, the start controller 300 determines whether a vehicle is in a stationary state (step S11). The start controller 300 detects the number of rotations of the rear wheel based on an output of the rear wheel rotation detection sensor SE8 and determines whether the vehicle is in a stationary state.

Then, the start controller 300 determines whether shift operation to the first gear position has been made while the brake is on (step S12). The start controller 300 makes a determination in step S12 based on detection values from the brake sensor SE5 and the shift operation detection sensor SE6.

If it is determined that the shift operation to the first gear position has been made while the brake is on, the start controller 300 sets the state status to a "pre-start standby state." The state status is stored in the RAM 54.

Figure 10:
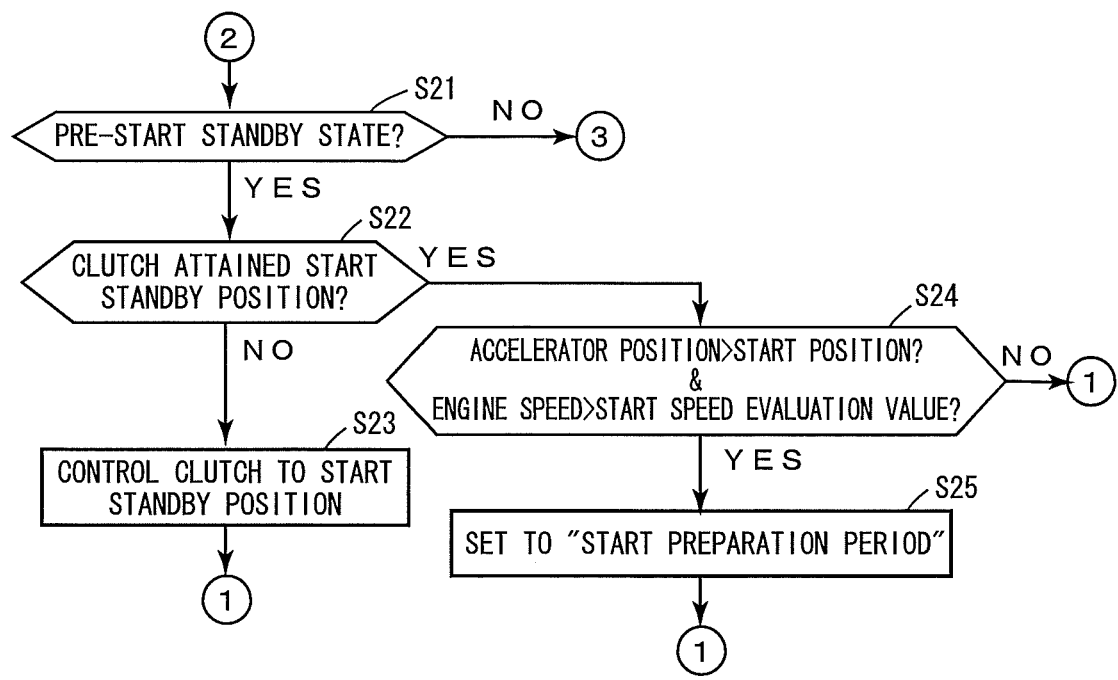
FIG. 10 is a flow chart for showing the content of the automatic start control process.

If it is determined that the vehicle is not in a stationary state, the control proceeds to step S21 in FIG. 10. In step S21, the start controller 300 refers to the state status and determines whether the vehicle is in a "pre-start standby state" (step S21).

If it is determined that the vehicle is in the "pre-start standby state," it is determined whether the clutch 3 has reached a start stand-by position (step S22). If the clutch 3 has not reached the start stand-by position, the control proceeds to step S23. In step S23, the start controller 300 carries out control to move the clutch 3 to the start standby position.

In step S22, if the clutch 3 has reached the start stand-by position, determination in step S24 is carried out. It is determined in step S24 whether the accelerator position is greater than the start position. It is further determined in step S24 whether the engine speed is greater than the start speed. If these conditions are both satisfied, the control proceeds to step S25 and the start controller 300 sets the state status to a "start preparation period." Note that the start position and the start speed are stored in the ROM 53 or RAM 54. The "start preparation period" is a period in which the clutch 3 is controlled based on the "start preparation position."

Figure 11:
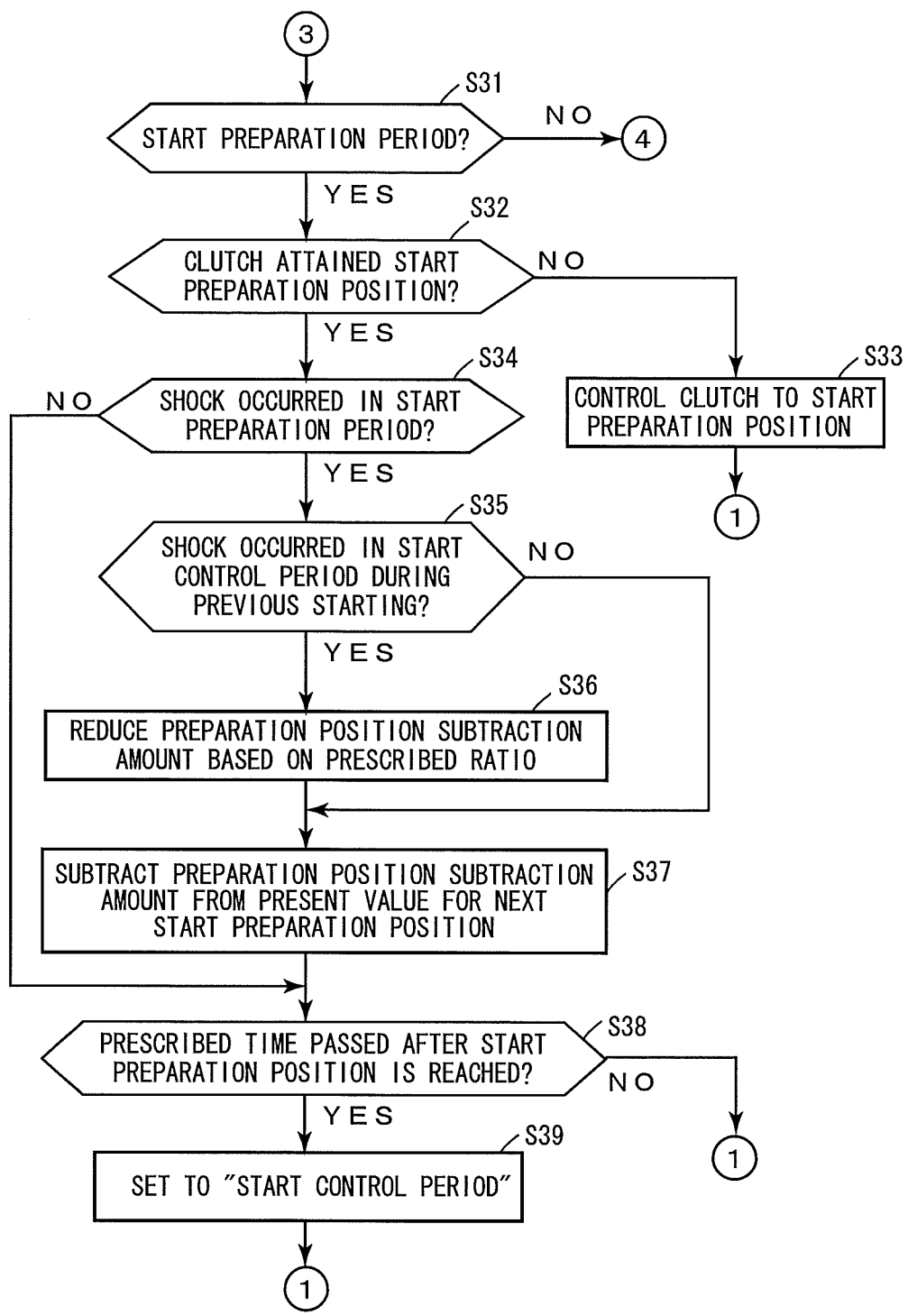
FIG. 11 is a flow chart for showing the content of the automatic start control process.

In step S21, if it is determined that the vehicle is not in the "start standby state," the control moves to step S31 in FIG. 11. It is determined in step S31 whether the state status is the "start preparation period."

If it is determined that the state status is the "start preparation period," the start controller 300 determines whether the clutch 3 has reached the "start preparation position" (step S32). If it is determined that the clutch 3 has not reached the "start preparation position" (NO in step S32), the start controller 300 controls the clutch 3 to attain the "start preparation position" (step S33). The clutch torque FF controller 41 moves the clutch position to the "start preparation position."

If the clutch 3 has reached the "start preparation position" (YES in step S32), the start controller 300 determines whether a shock has occurred in the start preparation period (step S34). The start controller 300 determines whether the above-described "first case shock" has occurred. The start controller 300 analyzes a detection value from the rear wheel rotation detection sensor SE8, carries out clutch control to the "start preparation position," and then determines whether the rear wheel speed has gone through the increase-decrease-increase change in an analysis period. The analysis period is a short period of about 0.5 seconds, for example. Information about the analysis period is stored in the RAM 54 or ROM 53.

If no shock has occurred in the start preparation period (NO in step S34), the control proceeds to step S38.

If shock has occurred in the start preparation period (YES in step S34), the start controller 300 determines whether shock has occurred in the start control period during the previous starting operation (step S35). Shock occurs in a start preparation period when the present setting of the start preparation position is too close to the clutch engagement side. The presence/absence of a shock in the present start preparation period is determined in step S34 while the presence/absence of a shock in the previous start control period is determined in step S35.

The shock in the start control period is the "second case shock" described above. The start controller 300 determines whether the rear wheel speed has gone through the increase-decrease-increase change in the analysis period after the start of the start control period.

If a shock has occurred in the start control period during the previous starting (YES in step S35), the start controller 300 reduces a "start preparation subtraction amount" based on a prescribed ratio (step S36). More specifically, a setting value for the "start preparation subtraction amount" set in the RAM 54 or ROM 53 is reduced based on a prescribed ratio. A subtraction ratio for the "start preparation subtraction amount" is preset and stored in the RAM 54 or ROM 53.

Assume that it is determined in step S34 that a shock has occurred in the start preparation period. Shock occurs when the start preparation position is too close to the clutch engagement side, the preparation position subtraction amount is subtracted from the start preparation position, and the start preparation position must be corrected in a direction away from the clutch. On the other hand, a shock has occurred in the previous start control period. Since this is because the start preparation position is too close to the clutch disengagement side during the previous starting, the preparation position addition amount is added to the start preparation position, and the start preparation position is corrected in the direction in which the clutch comes closer together. Therefore, if the same preparation position subtraction amount is reduced, a shock can occur again in the start control period. Therefore, the preparation position subtraction amount is reduced based on a prescribed ratio to adjust the start preparation position. This control can prevent the first case shock and the second case shock from occurring alternately. Information about the prescribed ratio is stored in the RAM 54 or ROM 53.

Then, in step S37, the "start preparation subtraction amount" is subtracted from the presently set "start preparation position" to correct the next "start preparation position." If the result of determination in step S35 is YES, the start preparation position is corrected based on the corrected "start preparation subtraction amount." If the result of determination in step S35 is NO, the start preparation position is corrected based on the "start preparation subtraction amount" that has been held from the previous time.

Then, it is determined whether a prescribed time has passed after the start preparation position is reached (step S38). If the prescribed time has passed (YES in step S38), the start controller 300 sets the status to a "start control period." The prescribed period determined in step S38 is an analysis period in which the presence/absence of the first case shock is detected. After the period, the start preparation period ends and the control proceeds to the start control period.

Figure 12:
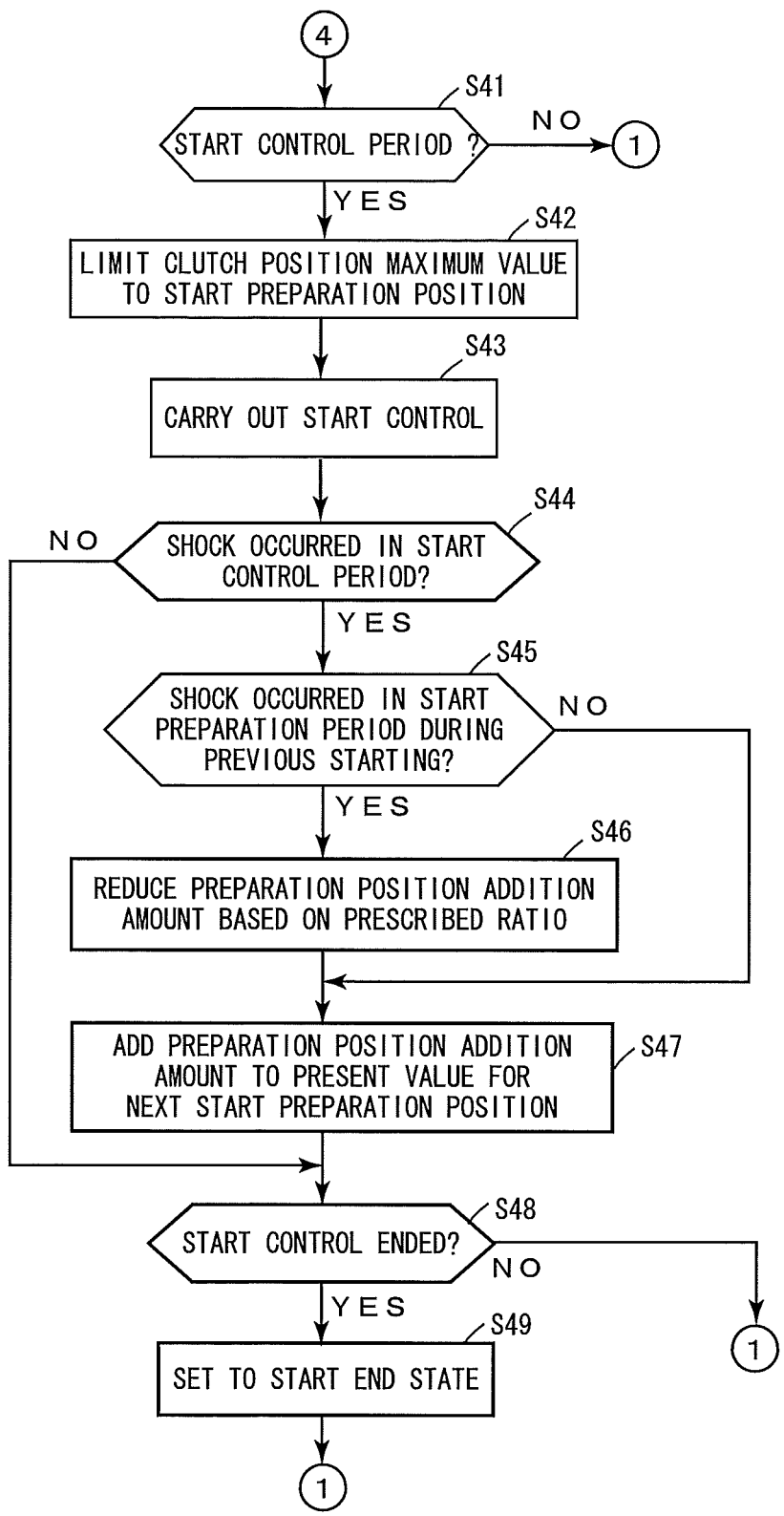
FIG. 12 is a flow chart for showing the content of the automatic start control process.

If it is not the "start preparation period" based on the result of determination in step S31, the control proceeds to step S41 in FIG. 12. In step S41, the start controller 300 determines whether the state status is the "start control period."

If it is determined that the state status is the "start control period," the start controller 300 limits a clutch position maximum value to the start preparation position (step S42). In the start control period, the clutch position is subjected to feedback control, and therefore the clutch 3 may be controlled in the disengaging direction depending on the detected condition. Therefore, the position is restricted so that the clutch position does not move in the disengaging direction beyond the start preparation position.

In step S43, the start controller 300 carries out start control (step S43). The start controller 300 starts start control toward the engine target speed.

In step S44, the start controller 300 determines whether a shock has occurred in a start control period. The start controller 300 determines whether the above described "second case shock" has occurred. The start controller 300 analyzes a detection value from the rear wheel rotation detection sensor SE8 and determines whether the rear wheel speed has gone through the increase-decrease-increase change in an analysis period. The analysis period is a short period such as about 0.5 seconds, for example. Information about the analysis period is stored in the RAM 54 or ROM 53.

If a shock has not occurred in the start control period (NO in step S44), the control proceeds to step S48.

If a shock has occurred in the start control period (YES in step S44), the start controller 300 determines whether a shock has occurred in the start preparation period during the previous starting (step S45). A shock occurs in the start control period if the presently set start preparation position is too close to the clutch disengagement side. In step S44, the presence/absence of a shock is determined in the present start control period, while in step S45, the presence/absence of a shock in the previous start preparation period is determined.

The shock in the start preparation period is the above-described "first case shock." The start controller 300 determines whether the rear wheel speed has gone through the increase-decrease-increase change in an analysis period after the start of the start preparation period.

If a shock has occurred in the start preparation period during the previous starting (YES in step S45), the start controller 300 reduces a "start preparation addition amount" based on a prescribed ratio (step S46). More specifically, a setting value for the "start preparation addition amount" set in the RAM 54 or RAM 53 is reduced based on a prescribed ratio. The ratio used to reduce the "start preparation addition amount" is previously set and stored in the RAM 54 or ROM 53.

Now, assume that it is determined in step S44 that a shock has occurred in the start control period. This is because the start preparation position is too close to the clutch disengagement side. Therefore, a preparation position addition amount is added to the start preparation position and the start preparation position should be corrected in the direction in which the clutch comes closer together. On the other hand, a shock occurred in the previous start preparation period. During the previous starting, the start preparation position was too close to the clutch engagement side, and therefore a preparation position subtraction amount is subtracted from the start preparation position so that the start preparation position is corrected to be away from the clutch. Therefore, if the same preparation position addition amount is added, a shock may once again occur in the start preparation period. Therefore, the preparation position addition amount is reduced based on a prescribed ratio to adjust the start preparation position. This control can prevent the first case shock and the second case shock from occurring alternately. Note that information about the prescribed ratio is stored in the RAM 54 or ROM 53.

Then, in step S47, a "start preparation addition amount" is added to the presently set "start preparation position" to correct the next start preparation position. If the result of determination in step S45 is YES, the start preparation position is corrected based on the corrected "start preparation addition amount." If the result of determination in step S45 is NO, the start preparation position is corrected based on the "start preparation addition amount" that has been held from the previous time.

Then, it is determined whether start control has ended (step S48). If the start control has ended (YES in step S48), the start controller 300 sets the status to a "start end state."

The start control system according to the present preferred embodiment includes the accelerator position sensor SE1 that inputs an accelerator position, the clutch torque FF controller 41 that controls a clutch, and the clutch actuator 4. The ROM 53 or RAM 54 stores a first setting value used to control the clutch 3 to attain a start standby state and a second setting value used to control the clutch 3 to attain a start preparation state. The ROM 53 or RAM 54 also stores association information that associates an accelerator position with an engine target speed. The clutch FF controller 41 and the clutch actuator 4 include a first controller that controls the clutch 3 to attain a start standby state based on the first setting value when it is determined that the vehicle 100 has proceeded to a start standby period, and a second controller that controls the clutch 3 to attain a start preparation state in which a distance between clutch disks is smaller than that in a start standby state based on the second setting value when it is determined that the vehicle 100 has proceeded to a start preparation period. The clutch FF controller 41 and the clutch actuator 4 include a third controller that controls the clutch 3 in the direction in which the distance between clutch disks is smaller than that in the start preparation state and performs such control that the engine speed approaches the engine target speed based on the association information.

At the time of starting, the clutch is subjected to two stage preparation including a start standby position and a start preparation position. Control to the start standby position which corresponds to the first stage preparation serves to improve responsiveness at the time of starting by allowing control start positions for clutch control to be closer to each other. Control to the start preparation position that corresponds to the second stage preparation allows for reduction of a shock occurring when the clutch disks start to engage. In this manner, start control with a reduced shock and high responsiveness is achieved.

In the start control system according to the present preferred embodiment, the clutch FF controller 41 and the clutch actuator 4 determine that the vehicle 100 has proceeded to a start standby period upon detecting the gear of the transmission device 5 being shifted to the first gear position while the vehicle 100 is in a stationary state. The first stage start preparation is performed based on a rider's first intention and, therefore, responsiveness in start control can be improved.

In the start control system according to the present preferred embodiment, the clutch FF controller 41 and the clutch actuator 4 determine that the vehicle 100 has proceeded to the start preparation period upon detecting the accelerator position being larger than a prescribed position and the engine speed being higher than a prescribed speed. The second stage start preparation is performed in response to direct operation by a rider to initiate starting. In this manner, a highly responsive start control can be achieved.

The start control system according to the present preferred embodiment includes the rear wheel rotation detection sensor SE8 that detects a speed of the vehicle 100 and the second controller determines start shock occurrence if a speed detected by the rear wheel rotation detection sensor SE8 includes a first increase period, a decrease period subsequent to the first increase period, and a second increase period subsequent to the decrease period within a prescribed time period after controlling the clutch 3 to attain the start preparation state. When the start shock has occurred before control by the third controller is started, the second setting value is updated so that the distance between clutch disks increases. The start preparation state is subjected to feed forward control and optimization is carried out so that a shock is reduced during the next starting control and thereafter.

Furthermore, the start control system according to the present preferred embodiment reduces an addition amount for the second setting value based on a prescribed ratio when a start shock has occurred after start of control by the third controller during the previous starting. The start preparation position can be moved closer to an optimum position.

The start control system according to the present preferred embodiment includes the rear wheel rotation detection sensor SE8 that detects a speed of the vehicle 100. The second controller controls the clutch 3 to attain a start preparation state and then determines start shock occurrence if a speed detected by the rear wheel rotation detection sensor SE8 includes a first increase period, a decrease period subsequent to the first increase period, and a second increase period subsequent to the decrease period within a prescribed period. When the start shock has occurred after start of control by the third controller, the second setting value is updated so that the distance between the clutch disks is reduced. The start preparation state is subjected to feed forward control, and optimization is carried out so that a shock is reduced during the next start control and thereafter.

Furthermore, in the start control system according to the present preferred embodiment, when a start shock has occurred before start of control by the third controller during the previous starting, a subtraction amount for the second setting value is reduced based on a prescribed ratio. The start preparation position can be moved closer to an optimum position.

Preferred embodiments of the present invention have been described with reference to the accompanying drawings, but the preferred embodiments of the present invention are intended to be widely construed within the scope of the appended claims rather than being limited by the detailed description thereof except for the portions otherwise indicated.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A start control system for a vehicle, the start control system comprising:
    an input unit that inputs an accelerator position;
    a clutch controller that controls a clutch; and
    a storing unit that stores setting information; wherein
    the storing unit includes:
    a setting value storage that stores a first setting value used to control the clutch to attain a start standby state and a second setting value used to control the clutch to attain a start preparation state; and
    an association information storage that stores association information that associates the accelerator position with an engine target speed;
    the clutch controller includes:
    a first controller that controls the clutch to attain the start standby state based on the first setting value upon determining that the vehicle has proceeded to a start standby period;
    a second controller that controls the clutch to attain the start preparation state based on the second setting value upon determining that the vehicle has proceeded to a start preparation period, a distance between clutch disks in the start preparation state being smaller than a distance between the clutch disks in the start standby state; and
    a third controller that controls the clutch such that the distance between the clutch disks is smaller than that in the start preparation state and carries out control such that an engine speed approaches the engine target speed based on the association information.

2. The start control system according to claim 1, wherein the clutch controller determines that the vehicle has proceeded to the start standby period upon detecting a gear of a transmission device being shifted to a first gear position while the vehicle is in a stationary state.

3. The start control system according to claim 1, wherein the clutch controller determines that the vehicle has proceeded to the start preparation period upon detecting a value representing the accelerator position being larger than a prescribed value and the engine speed being higher than a prescribed speed.

4. The start control system according to claim 1, further comprising a speed detector that detects a speed of the vehicle; wherein
    the second controller includes:
    a determining unit that determines that a start shock has occurred if a speed detected by the speed detector includes a first increase period, a decrease period subsequent to the first increase period, and a second increase period subsequent to the decrease period within a prescribed time period after the clutch is controlled to attain the start preparation state; and a first updating unit that updates the second setting value so that the distance between the clutch disks increases when the start shock has occurred before a start of control by the third controller.

5. The start control system according to claim 4, wherein the first updating unit reduces an addition amount of the second setting value based on a prescribed ratio when the start shock has occurred after the start of control by the third controller during a previous starting.

6. The start control system according to claim 1, further comprising a speed detector that detects a speed of the vehicle; wherein the second controller includes a determining unit that determines that a start shock has occurred if a speed detected by the speed detector includes a first increase period, a decrease period subsequent to the first increase period, and a second increase period subsequent to the decrease period within a prescribed time period after controlling the clutch to attain the start preparation state; and a second updating unit that updates the second setting value so that the distance between the clutch disks is reduced when the start shock has occurred after the start of control by the third controller.

7. The start control system according to claim 6, wherein the second updating unit reduces a subtraction amount of the second setting value based on a prescribed ratio when the start shock has occurred before the start of control by the third controller during a previous starting.

8. A vehicle comprising:
the start control system according to claim 1.

9. A motorcycle comprising:
the start control system according to claim 1.

* * * * *